United States Patent
Carpenter et al.

(10) Patent No.: US 10,181,038 B2
(45) Date of Patent: Jan. 15, 2019

(54) DEPLOYMENT ASSURANCE CHECKS FOR MONITORING INDUSTRIAL CONTROL SYSTEMS

(71) Applicant: Honeywell International Inc., Morris Plains, NJ (US)

(72) Inventors: Seth G. Carpenter, Phoenix, AZ (US); Eric D. Knapp, Milton, NH (US)

(73) Assignee: Honeywell International Inc., Morris Plains, NJ (US)

( * ) Notice: Subject to any disclaimer, the term of this patent is extended or adjusted under 35 U.S.C. 154(b) by 114 days.

(21) Appl. No.: 14/943,876

(22) Filed: Nov. 17, 2015

(65) Prior Publication Data

US 2017/0140154 A1    May 18, 2017

(51) Int. Cl.
| | | |
|---|---|---|
| *G06F 11/00* | (2006.01) | |
| *G06F 12/14* | (2006.01) | |
| *G06F 12/16* | (2006.01) | |
| *G08B 23/00* | (2006.01) | |
| *G06F 21/57* | (2013.01) | |
| *G05B 19/00* | (2006.01) | |

(52) U.S. Cl.
CPC .......... *G06F 21/577* (2013.01); *G05B 19/00* (2013.01); *G06F 2221/034* (2013.01)

(58) Field of Classification Search
None
See application file for complete search history.

(56) References Cited

U.S. PATENT DOCUMENTS

| 9,639,140 B2* | 5/2017 | Piga ................... G06F 1/3228 |
| 2008/0141240 A1* | 6/2008 | Uthe ..................... G06F 8/61 717/174 |
| 2009/0328209 A1 | 12/2009 | Nachenberg |
| 2010/0094981 A1* | 4/2010 | Cordray ............. G06F 15/173 709/222 |
| 2013/0031037 A1* | 1/2013 | Brandt .............. H04L 63/1408 706/12 |
| 2015/0007315 A1 | 1/2015 | Rivera et al. |

(Continued)

FOREIGN PATENT DOCUMENTS

| JP | 2015103212 A | 6/2015 |
| KR | 20060017346 A | 2/2006 |
| KR | 101233934 B1 | 2/2013 |

OTHER PUBLICATIONS

Gerhards, R.; "The Syslog Protocol"; Network Working Group; Adiscon GmbH; Mar. 2009; 38 pages.

(Continued)

*Primary Examiner* — Kambiz Zand
*Assistant Examiner* — Arezoo Sherkat

(57) ABSTRACT

This disclosure provides an apparatus and method for deployment assurance checks for monitoring industrial control systems and other systems. A method includes identifying, by a risk manager system, a plurality of connected devices that are vulnerable to cyber-security risks. The method includes determining devices to be monitored from the plurality of connected devices. The method includes evaluating system resource usage, by the risk manager system, on each device to be monitored. The method includes providing recommendations to a user as to whether or not the user should proceed with the monitoring, based on the evaluation.

14 Claims, 8 Drawing Sheets

(56) References Cited

U.S. PATENT DOCUMENTS

2016/0180093 A1* 6/2016 Goss .................. G06F 21/57
 726/1
2017/0054605 A1* 2/2017 Duncan .............. H04L 41/0686

OTHER PUBLICATIONS

Knapp, E.D.; "Security Intelligence and Analytics in Industrial Systems"; Honeywell Users Group Europe, Middle East and Africa; 2014; 29 pages.
Koelemij, E.D.; "Effective Defense in Depth Strategies for Industrial Control Systems"; Honeywell Users Group Europe, Middle East and Africa; 2014; 21 pages.
Koelemij, S.; "Designing a Secure Industrial Control System"; Honeywell Users Group EMEA; Industrial IT Solutions: 2013; 11 pages.
Koelemij, S.; "Making Cyber Security S.M.A.R.T."; Honeywell Industrial Cyber Security; EMEA HUG Training Session; 2014; 63 pages.
Ricks, B.; "System Center 2012 R2 Operations Manager Documentation"; Microsoft System Center 2012 R2; Microsoft Corp; Nov. 1, 2013; 1389 pages.
Spear, M.; "Industrial Cyber Security 101"; Honeywell Users Group Europe, Middle East and Africa; 2015; 25 pages.
"Certification Testing Specification"; OPC Foundation; Release Candidate 1.02; May 28, 2014; 20 pages.
"Guide for Conducting Risk Assessments—Information Security"; NIST Special Publication 800-30, Revision 1; NIST, U.S. Dept of Commerce; Sep. 2012; 95 pages.
"Honeywell Industrial Cyber Security Overview and Managed Industrial Cyber Security Services"; HPS; Jun. 4, 2014; 19 pages.
"Information Technology—Security Techniques—Information Security Risk Management"; Bio Standards Publication; BS ISO/IEC 27005;2011; 80 pages.
"Risk Management and Critical Infrastructure Protection: Assessing, Integrating, and Managing Threats, Vulnerabilities and Consequences"; CRS Rpt for Congress; RL32561; Feb 4, 2005; 28 pages.
"Security for Industrial Automation and Control Systems Part 2-3: Patch Management in the IACS Environment"; ISA-TR62443-2-3-2015; Jul. 1, 2015; 18 pages.
"Design and Planning Guide for System Center 2012—Operations Manager"; System Center 2012; Microsoft Corporation; Apr. 2012; 13 pages.
Notification of Transmittal of the International Search Report and the Written Opinion of the International Searching Authority, or the Declaration dated Jan. 26, 2017 in connection with International Patent Application No. PCT/US2016/059667.

* cited by examiner

Add New Devices - Select Devices to Monitor

Unmonitored Devices

| | Name | Entity Type | OS |
|---|---|---|---|
| ☑ | WINSRV.CSDPHX.com | PC | Windows Server 2008 R2 |
| ☑ | WIN7CLNT1.CSDPHX.com | PC | Windows 7 |
| ☑ | OLDCLIENT.CSDPHX.com | PC | Windows XP |
| ☐ | OLDCLIENT2.CSDPHX.com | PC | Windows XP |

[Back] [Next]

FIG. 5

Add New Devices - Resource Check

Unmonitored Devices

| | Name | Entity Type | CPU Usage | Physical Memory Usage | Disk Space Usage | PowerShell Version | Recommendation |
|---|---|---|---|---|---|---|---|
| ☑ | WINSRV.CSDPHX.com | PC | 15% | 55% | 60% | 2.0 | Install Agent |
| ☑ | WIN7CLNT1.CSDPHX.com | PC | 35% | 40% | 20% | 3.0 | Install Agent |
| ☐ | OLDCLIENT.CSDPHX.com | PC | 80% | 90% | 93% | 1.0 | Do Not Install Agent |

602 → CPU Usage
604 → Physical Memory Usage
606 → Disk Space Usage

Back    Next

FIG. 6

Add New Devices - Provide Credentials for Agent Install

Unmonitored Devices

| | Name | Entity Type | PowerShell Version | Firewall Settings | Recommendation |
|---|---|---|---|---|---|
| ☑ | WINSRV.CSDPHX.com | PC | 3.0 | OK | Install Agent |
| ☑ | WIN7CLNT1.CSDPHX.com | PC | 2.0 | Need Exceptions | Add Firewall Exceptions |
| ☐ | OLDCLIENT.CSDPHX.com | PC | | | Do Not Install Agent |

Username

Password

Back    Deploy Agent to Selected Devices

DEPLOYMENT ASSURANCE CHECKS FOR MONITORING INDUSTRIAL CONTROL SYSTEMS

TECHNICAL FIELD

This disclosure relates generally to network security. More specifically, this disclosure relates to an apparatus and method for deployment assurance checks for monitoring industrial control systems and other systems.

BACKGROUND

Processing facilities are often managed using industrial process control and automation systems. Conventional control and automation systems routinely include a variety of networked devices, such as servers, workstations, switches, routers, firewalls, safety systems, proprietary real-time controllers, and industrial field devices. Often times, this equipment comes from a number of different vendors. In industrial environments, cyber-security is of increasing concern, and unaddressed security vulnerabilities in any of these components could be exploited by attackers to disrupt operations or cause unsafe conditions in an industrial facility.

SUMMARY

This disclosure provides an apparatus and method for deployment assurance checks for monitoring industrial control systems and other systems. A method includes identifying, by a risk manager system, a plurality of connected devices that are vulnerable to cyber-security risks. The method includes determining devices to be monitored from the plurality of connected devices. The method includes evaluating system resource usage, by the risk manager system, on each device to be monitored. The method includes providing recommendations to a user as to whether or not the user should proceed with the monitoring, based on the evaluation.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 3-8 illustrate example user interfaces that can be used as part of disclosed embodiments.

DETAILED DESCRIPTION

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
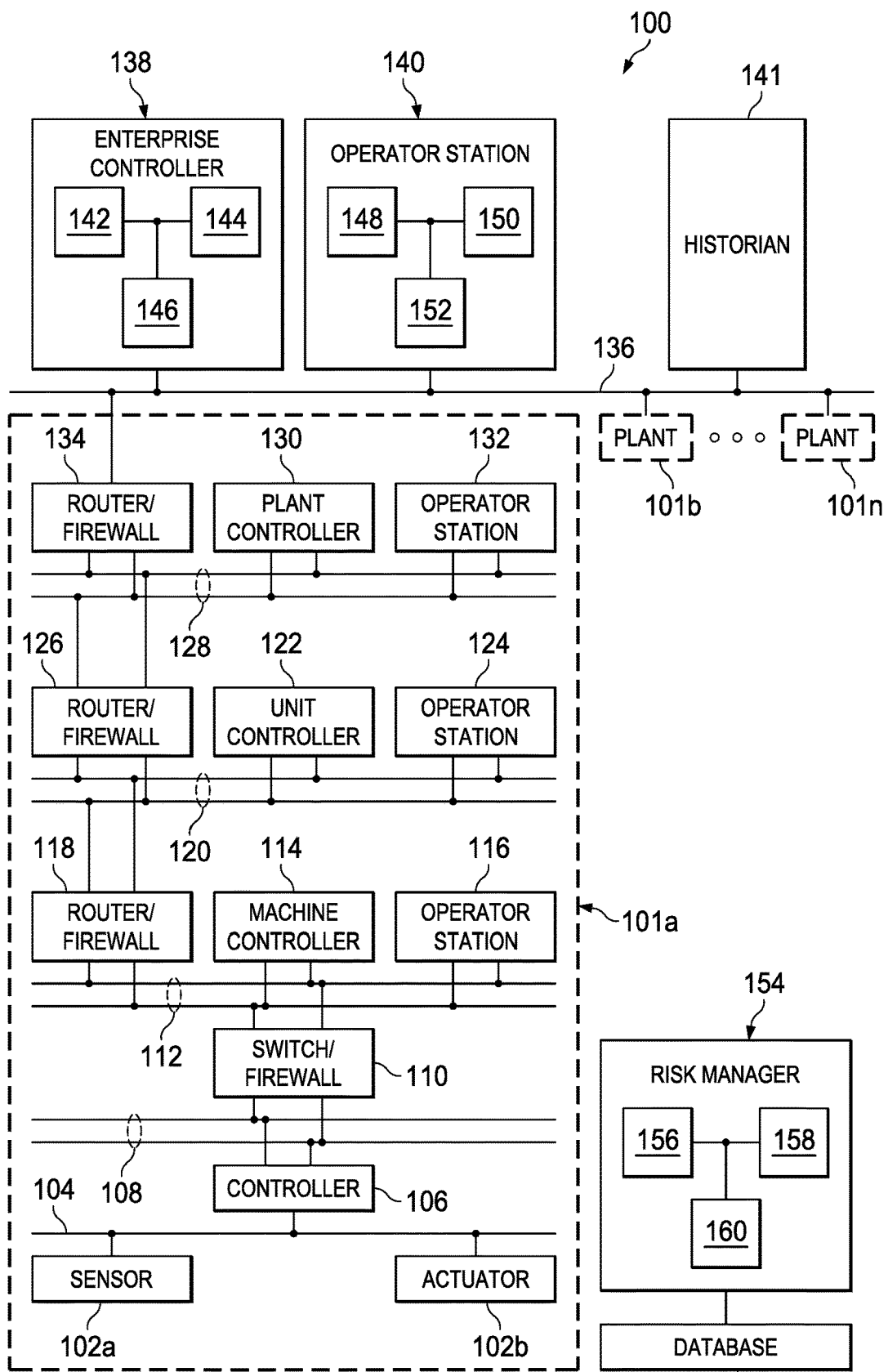
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a proportional-integral-derivative (PID) controller or a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As a particular example, the networks 108 could represent a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as an FTE network.

In the Purdue model, "Level 2" may include one or more machine-level controllers 114 coupled to the networks 112. The machine-level controllers 114 perform various functions to support the operation and control of the controllers 106, sensors 102*a*, and actuators 102*b*, which could be associated with a particular piece of industrial equipment (such as a boiler or other machine). For example, the machine-level controllers 114 could log information collected or generated by the controllers 106, such as measurement data from the sensors 102*a* or control signals for the actuators 102*b*. The machine-level controllers 114 could also execute applications that control the operation of the controllers 106, thereby controlling the operation of the actuators 102*b*. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102*a*, and actuators 102*b*).

One or more operator stations 116 are coupled to the networks 112. The operator stations 116 represent computing or communication devices providing user access to the machine-level controllers 114, which could then provide user access to the controllers 106 (and possibly the sensors 102*a* and actuators 102*b*). As particular examples, the operator stations 116 could allow users to review the operational history of the sensors 102*a* and actuators 102*b* using information collected by the controllers 106 and/or the machine-level controllers 114. The operator stations 116 could also allow the users to adjust the operation of the sensors 102*a*, actuators 102*b*, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102*a*, and actuators 102*b*).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as an FTE network.

In the Purdue model, "Level 4" may include one or more plant-level controllers 130 coupled to the networks 128. Each plant-level controller 130 is typically associated with one of the plants 101*a*-101*n*, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101*a*-101*n* and to control various aspects of the plants 101*a*-101*n*. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers 106, 114, 122, 130, 138 could include one or more processing devices 142 and one or more memories 144 for storing instructions and data used, generated, or collected by the processing device(s) 142. Each of the controllers 106, 114, 122, 130, 138 could also include at least one network interface 146, such as one or more Ethernet interfaces or wireless transceivers. Also, each of the operator stations 116, 124, 132, 140 could include one or more processing devices 148 and one or more memories 150 for storing instructions and data used, generated, or collected by the processing device(s) 148. Each of the operator stations 116, 124, 132, 140 could also include at least one network interface 152, such as one or more Ethernet interfaces or wireless transceivers.

As noted above, cyber-security is of increasing concern with respect to industrial process control and automation systems. Unaddressed security vulnerabilities in any of the components in the system 100 could be exploited by attackers to disrupt operations or cause unsafe conditions in an industrial facility. In industrial environments, cyber security is of increasing concern, and it is difficult to quickly determine the potential sources of risk to the whole system. Modern control systems contain a mix of Windows servers and workstations, switches, routers, firewalls, safety systems, proprietary real-time controllers and field devices, any of which can be implemented by one or another of the components in system 100.

Often these systems are a mixture of equipment from different vendors. Sometimes the plant operators do not have a complete understanding or inventory of all the equipment running in their site. Unaddressed security vulnerabilities in any of these components could be exploited by attackers to disrupt production or cause unsafe conditions in the plant. Disclosed embodiments can address the potential vulnerabilities in all these systems, prioritize the vulnerabilities based on the risk to the system, and guide the user to mitigate the vulnerabilities.

Any monitoring system will necessarily have some performance impact on the monitored system, no matter how small. It will also have some requirements or prerequisites that must be met in order to monitor that system. The highest priorities for a control system are safety and production, so it is critical that any monitoring of that system does not jeopardize either of these aspects. This is true whether an agent is installed on the end devices for monitoring or whether "agentless" protocols are used for monitoring (which take advantage of hooks and APIs already present in the end devices).

A monitoring system then should be able to verify these requirements and ensure that it will not have an adverse impact on system safety or production prior to starting its monitoring. This can be accomplished (among other ways) using a risk manager 154. Among other things, the risk manager 154 supports a technique for monitoring a system such as an industrial control system and checking for proper deployment of the devices and components of that system.

In this example, the risk manager 154 includes one or more processing devices 156; one or more memories 158 for storing instructions and data used, generated, or collected by the processing device(s) 156; and at least one network interface 160. Each processing device 156 could represent a microprocessor, microcontroller, digital signal process, field programmable gate array, application specific integrated circuit, or discrete logic. Each memory 158 could represent a volatile or non-volatile storage and retrieval device, such as a random access memory or Flash memory. Each network interface 160 could represent an Ethernet interface, wireless transceiver, or other device facilitating external communication. The functionality of the risk manager 154 could be implemented using any suitable hardware or a combination of hardware and software/firmware instructions. In some embodiments, the risk manager 154 includes, or is communication with, a database 155. The database 155 denotes any suitable structure facilitating storage and retrieval of information.

Although FIG. 1 illustrates one example of an industrial process control and automation system 100, various changes may be made to FIG. 1. For example, a control and automation system could include any number of sensors, actuators, controllers, servers, operator stations, networks, risk managers, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates an example environment in which the functions of the risk manager 154 can be used. This functionality can be used in any other suitable device or system.

In some risk manager implementations, the user installing and configuring the risk manager would be responsible for verifying that each end device is ready for monitoring. In many cases, a user will simply attempt to monitor the end device and hope there are no adverse effects. The attempt to monitor the device may also fail, leaving the user to contacting technical support or try independently troubleshooting.

Disclosed embodiments automate those checks, provide feedback to the installing user, and provide a recommendation as to whether the user should proceed. It can identify situations where monitoring is not recommended (e.g., the user might not want to risk upsetting the system by monitoring a device already suffering from low resources) and situations where monitoring would fail if attempted (e.g., trying to push a monitoring agent to the device would be blocked by the current security settings). A recommendation as to whether the user should proceed can be as simple as a "yes/no" indicator, or can be more specific recommendations as to actions that should or should not be taken if the user is to proceed.

The techniques disclosed herein can be applied to both "agent-based" and "agentless" monitoring of end devices. The distinction between the two is that agent-based monitoring will add a resident program to the monitored device, while agentless monitoring takes advantage of features already present in the end device to perform the monitoring functions. Often agentless monitoring takes advantages of APIs present in the operating system (such as the Windows Management Infrastructure (WMI) available on Microsoft Windows platforms) or otherwise already present on the end device.

For example, in agent-based system, once devices are discovered, the agent needs to be deployed. This may require that some security settings are disabled, and requires a certain amount of free CPU, memory and disk space. The pre-check process can perform such functions as checking security configurations to see if the agent can be pushed without any changes; checking memory to ensure that there is sufficient free RAM to install the agent and still have a healthy margin of available memory; checking CPU utilization to ensure that there is sufficient free CPU to install the agent and still have a healthy margin of available memory; and checking a hard disk drive (HDD) to ensure that there is sufficient free HDD space to install the agent and still have a healthy margin of available storage.

Figure 2:
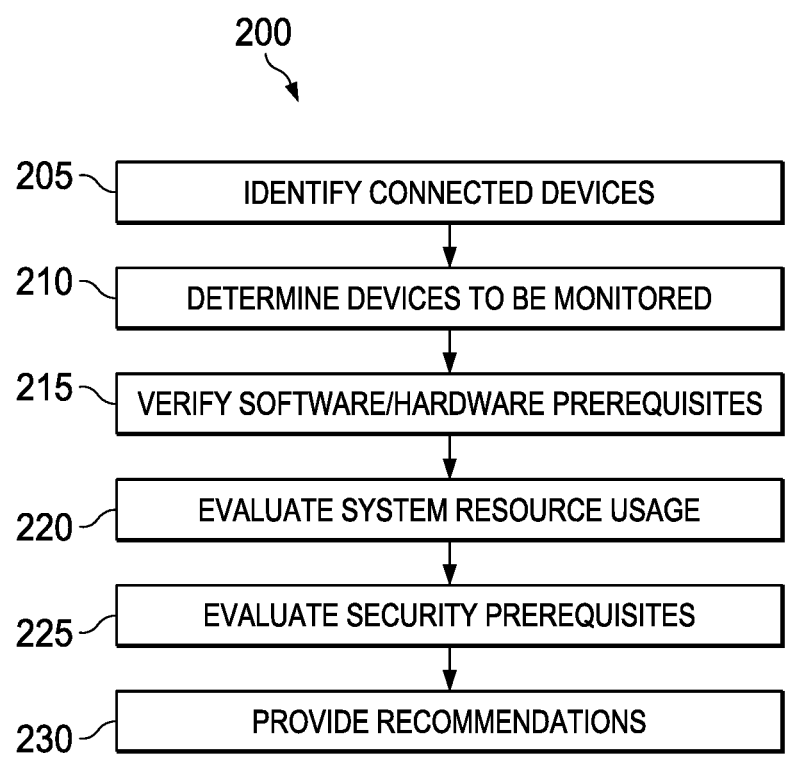
FIG. 2 illustrates a flowchart of a process in accordance with disclosed embodiments.

FIG. 2 illustrates a flowchart of a method 200 in accordance with disclosed embodiments, as can be performed, for example, by risk manager 154 or another device or controller (referred to as the "system" or "risk manager system" below).

The system identifies a plurality of connected devices that are vulnerable to cyber-security risks (205). These devices can be any computing devices, such as any of the components of FIG. 1 or those described below. Devices can be automatically discovered and added by the system. Devices can be added manually by the user, for example by entering such information as an IP address, an SNMP community string, or others.

The system determines devices to be monitored (210). This can include receiving manual entries from a user that identify the devices to be monitored, by automatic discovery methods such as enumerating PCs in Active Directory for Windows domains or searching through machines within the subnet of the monitoring host, or otherwise. The devices to be monitored can include any of the devices described herein, including those described above with respect to FIG. 1 and those described below.

The system can verify any relevant software or hardware prerequisites on the devices to be monitored (215). For example, in implementations using agent-based monitoring, when monitoring Windows PCs, the agent can use Microsoft PowerShell scripts on the local machine to collect data, and some of these scripts require PowerShell version 2.0 or later. The system can validate whether or not the appropriate software version is present on each device to be monitored through a remote WMI query against that machine. This step may not be necessary for agentless monitoring approaches, as the mechanism for data collection may be an integral part of the system.

The system evaluates system resource usage on each device to be monitored to ensure that the monitoring will not push it beyond acceptable thresholds (220). Useful resources to check include, but are not limited to, CPU, memory and disk space. A threshold can be selected for each resource checked (e.g., all validated resource usage should be below 80%). This can be used to help make the user recommendation described herein. Again, in the example of a risk manager looking at a Windows PC, this data can be collected via remote WMI queries.

The system evaluates security prerequisites on the connected devices (225). These might include checking firewall settings on each device and validating that the monitoring process is running from an account that is recognized and has sufficient privileges on the end device. This process can also include receiving credentials from a user or sending credentials to the connected devices.

The system provides recommendations to the user as to whether or not they should proceed with the monitoring (230). If a device fails hardware, software or security prerequisite checks, the user can be advised that monitoring may not work correctly (or at all), and provide steps that need to be taken on the end device. If a device fails resource checks, the user can be advised of possible system instability if they proceed with monitoring. The recommendations can be displayed to a user, transmitted to a user device, or otherwise.

As part of providing recommendations, the system can also offer some level of enforcement of the recommendations. Possible levels of enforcement include:

a. No enforcement—The user is presented with the information gathered by the system, but uses that information to decide how to proceed with no further restriction from the system.

b. "Soft" enforcement—The user is presented with a recommendation for each device, and the option whether or not to proceed for a given device is preselected. The user can still override that selection (they may be presented with a warning message that they must acknowledge first).

c. "Hard" enforcement—The user is presented with a recommendation for each device, but cannot proceed with monitoring on any device that does not pass the system checks.

The system can provide the recommendations by means of a notification, such as by email, SMS, OPC, system center, or otherwise.

The steps in the processes described herein, unless specifically described otherwise, may be performed concurrently, sequentially, or repeatedly, may be omitted, or may be performed in a different order.

Figure 3:
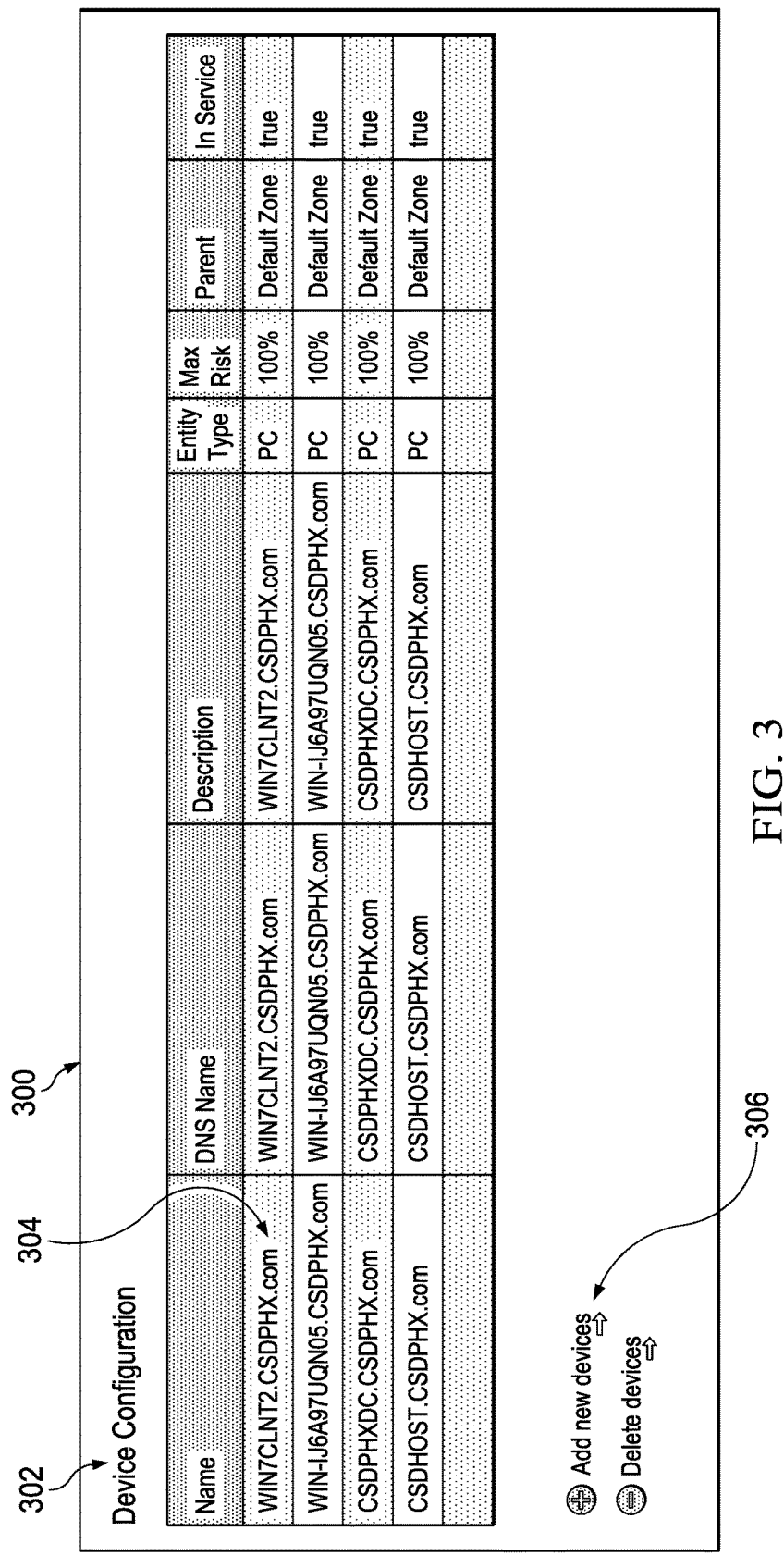

FIG. 3 illustrates a user interface 300 that may be presented to a user, for example by the risk manager 154 or another system, for interacting with a user as part of processes described herein. This figure illustrates a device configuration 302, showing a plurality of connected devices 304 that have been identified by the system. Also shown is an "add new devices" button 306; when a user selects this button, the system will receive new device information from the user either manually or via a wizard. Devices 304 can be automatically discovered and added by the system. Devices can be added manually by the user, for example by entering such information as an IP address, an SNMP community string, or others.

Figure 4:
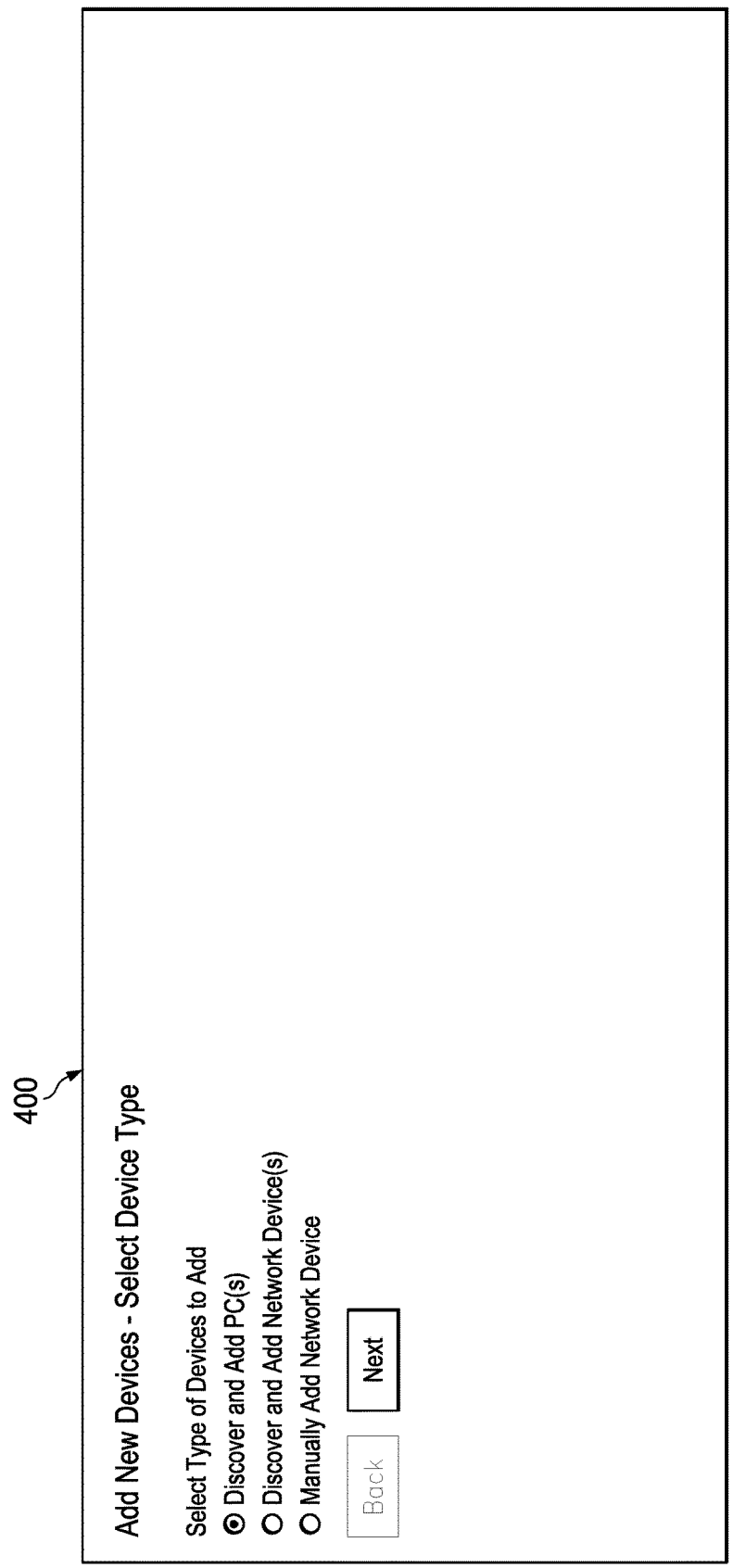

FIG. 4 illustrates a user interface 400 that may be presented to a user, for example by the risk manager 154 or another system, for interacting with a user as part of processes described herein. This figure illustrates an interface to add new devices, either manually or by automatic discovery by the system of PCs, network devices, or other connected devices. Similar techniques can be used to delete a connected device from the monitoring list.

FIG. 5 illustrates a user interface 500 that may be presented to a user, for example by the risk manager 154 or another system, for interacting with a user as part of processes described herein. This figure illustrates an interface for determining devices to monitor 502, in this case by receiving a selection from a user.

FIG. 6 illustrates a user interface 600 that may be presented to a user, for example by the risk manager 154 or another system, for interacting with a user as part of processes described herein. This figure illustrates an interface for evaluating resources of the devices to be monitored, such as CPU usage 602, physical memory usage 604, and disk space usage 606.

FIG. 7 illustrates a user interface 700 that may be presented to a user, for example by the risk manager 154 or another system, for interacting with a user as part of processes described herein. This figure illustrates an interface for providing credentials to install or deploy an agent on a connected device. A similar interface can be used to provide credentials to remove an agent from a connected device. This figure also illustrates an example of recommendations 702 that are provided to a used as to whether or not the user should proceed with the monitoring, based on the evaluation, including specific actions that are recommended to be taken or not taken (such as installing an agent or adding firewall exceptions).

Figure 8:
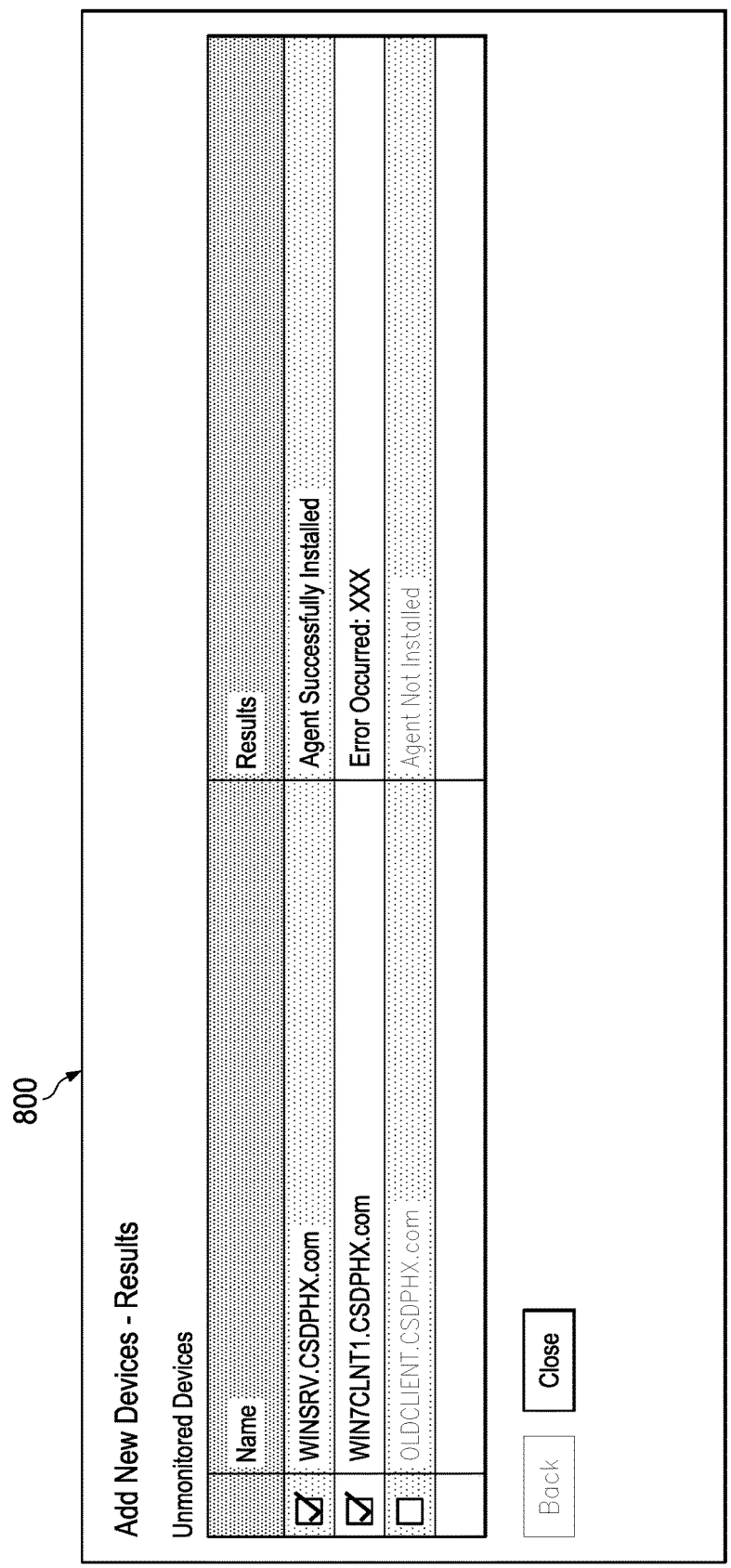

FIG. 8 illustrates a user interface 800 that may be presented to a user, for example by the risk manager 154 or another system, for interacting with a user as part of processes described herein. This figure illustrates an interface for showing results of adding new devices and installing or deploying an agent on the connected devices.

Note that the risk manager 154 and/or the other processes, devices, and techniques described herein could use or operate in conjunction with any combination or all of various features described in the following previously-filed patent applications (all of which are hereby incorporated by reference):

U.S. patent application Ser. No. 14/482,888 entitled "DYNAMIC QUANTIFICATION OF CYBER-SECURITY RISKS IN A CONTROL SYSTEM";

U.S. Provisional Patent Application No. 62/036,920 entitled "ANALYZING CYBER-SECURITY RISKS IN AN INDUSTRIAL CONTROL ENVIRONMENT";

U.S. Provisional Patent Application No. 62/113,075 entitled "RULES ENGINE FOR CONVERTING SYSTEM-RELATED CHARACTERISTICS AND EVENTS INTO CYBER-SECURITY RISK ASSESSMENT VALUES" and corresponding non-provisional U.S. patent application Ser. No. 14/871,695;

U.S. Provisional Patent Application No. 62/113,221 entitled "NOTIFICATION SUBSYSTEM FOR GENERATING CONSOLIDATED, FILTERED, AND RELEVANT SECURITY RISK-BASED NOTIFICATIONS" and corresponding non-provisional U.S. patent application Ser. No. 14/871,521;

U.S. Provisional Patent Application No. 62/113,100 entitled "TECHNIQUE FOR USING INFRASTRUCTURE MONITORING SOFTWARE TO COLLECT CYBER-SECURITY RISK DATA" and corresponding non-provisional U.S. patent application Ser. No. 14/871,855;

U.S. Provisional Patent Application No. 62/113,186 entitled "INFRASTRUCTURE MONITORING TOOL FOR COLLECTING INDUSTRIAL PROCESS CONTROL AND AUTOMATION SYSTEM RISK DATA" and corresponding non-provisional U.S. patent application Ser. No. 14/871,732;

U.S. Provisional Patent Application No. 62/113,165 entitled "PATCH MONITORING AND ANALYSIS" and corresponding non-provisional U.S. patent application Ser. No. 14/871,921;

U.S. Provisional Patent Application No. 62/113,152 entitled "APPARATUS AND METHOD FOR AUTOMATIC HANDLING OF CYBER-SECURITY RISK EVENTS" and corresponding non-provisional U.S. patent application Ser. No. 14/871,503;

U.S. Provisional Patent Application No. 62/114,928 entitled "APPARATUS AND METHOD FOR DYNAMIC CUSTOMIZATION OF CYBER-SECURITY RISK ITEM RULES" and corresponding non-provisional U.S. patent application Ser. No. 14/871,605;

U.S. Provisional Patent Application No. 62/114,865 entitled "APPARATUS AND METHOD FOR PROVIDING POSSIBLE CAUSES, RECOMMENDED ACTIONS, AND POTENTIAL IMPACTS RELATED TO IDENTIFIED CYBER-SECURITY RISK ITEMS" and corresponding non-provisional U.S. patent application Ser. No. 14/871,814; and U.S. Provisional Patent Application No. 62/114,937 entitled "APPARATUS AND METHOD FOR TYING CYBER-SECURITY RISK ANALYSIS TO COMMON RISK METHODOLOGIES AND RISK LEVELS" and corresponding non-provisional U.S. patent application Ser. No. 14/871,136; and U.S. Provisional Patent Application No. 62/116,245 entitled "RISK MANAGEMENT IN AN AIR-GAPPED ENVIRONMENT" and corresponding non-provisional U.S. patent application Ser. No. 14/871,547.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for deployment assurance checks for monitoring an industrial control systems, comprising:
   identifying, by a risk manager system, a plurality of connected devices that are vulnerable to cyber-security risks;
   determining, by the risk manager system, devices to be monitored from the plurality of connected device;
   verifying any relevant software or hardware prerequisites on the devices to be monitored;
   validating whether an appropriate software version is present on each device to be monitored through a remote Windows Management Infrastructure (WMI) query by a user;
   evaluating system resource usage, by the risk manager system, on each device to be monitored;
   evaluating, by the risk manager system, security prerequisites on the connected devices, the evaluating security prerequisites includes:
   checking firewall setting on each device,
   validating that monitoring process is running from an account that is recognized, and
   receiving credentials from a user and sending credentials to the connected devices; and
   providing recommendations to the user, by the risk manager system, as to whether or not the user should proceed with the monitoring, based on the evaluation and on whether the monitoring would increase the system resource usage beyond a predetermined threshold and recommendations as to whether or not to install a monitoring agent on each of the connected devices and providing a level of enforcement of the recommendations, the level of enforcement includes at least one of "No" enforcement "Soft" enforcement or "Hard" enforcement.

2. The method of claim 1, wherein identifying the plurality of connected devices includes performing an automatic discovery process by the risk manager system.

3. The method of claim 1, wherein the system resource usage includes processor usage, memory usage, and disk space usage.

4. The method of claim 1, further comprising selectively enforcing the recommendations on each of the plurality of devices.

5. The method of claim 1, wherein identifying the plurality of connected devices includes receiving device information by the risk manager system from the user.

6. A risk manager system comprising:
   a controller; and
   a memory, the risk manager system configured to:
   identify a plurality of connected devices that are vulnerable to cyber-security risks;
   determine devices to be monitored from the plurality of connected devices;
   verify any relevant software or hardware prerequisites on the devices to be monitored;
   validate whether an appropriate software version is present on each device to be monitored through a remote Windows Management Infrastructure (WMI) query by a user;
   evaluate system resource usage on each device to be monitored;
   evaluate evaluating security prerequisites on the connected devices, the evaluation of security prerequisites includes:
   check firewall setting on each device,
   validate that monitoring process is running from an account that is recognized, and
   receive credentials from the user and send credentials to the connected devices; and
   provide recommendations to the user as to whether or not the user should proceed with the monitoring, based on the evaluation and on whether the monitoring would increase the system resource usage beyond a predetermined threshold and recommendations as to whether or not to install a monitoring agent on each of the connected devices and provide a level of enforcement of the recommendations, the level of enforcement includes at least one of "No" enforcement, "Soft" enforcement or "Hard" enforcement.

7. The risk manager system of claim 6, wherein the risk manager system is configured to identify the plurality of connected devices by performing an automatic discovery process.

8. The risk manager system of claim 6, wherein the system resource usage includes processor usage, memory usage, and disk space usage.

9. The risk manager system of claim 6, wherein the risk manager system is further configured to selectively enforce the recommendations on each of the plurality of devices.

10. The risk manager system of claim 6, wherein the risk manager system is configured to identify the plurality of connected devices by receiving device information by the risk manager system from the user.

11. A non-transitory machine-readable medium encoded with executable instructions that, when executed, cause one or more processors of a risk manager system to:
  identify a plurality of connected devices that are vulnerable to cyber-security risks;
  determine devices to be monitored from the plurality of connected devices;
  verify any relevant software or hardware prerequisites on the devices to be monitored;
  validate whether an appropriate software version is present on each device to be monitored through a remote Windows Management Infrastructure (WMI) query by a user:
  evaluate system resource usage on each device to be monitored;
  evaluate security prerequisites on the connected devices, the evaluation of security prerequisites includes:
  check firewall setting on each device,
  validate that monitoring process is running from an account that is recognized, and
  receive credentials from the user and send credentials to the connected devices; and
  provide recommendations to the user as to whether or not the user should proceed with the monitoring, based on the evaluation and on whether the monitoring would increase the system resource usage beyond a predetermined threshold and recommendations as to whether or not to install a monitoring agent on each of the connected devices and provide a level of enforcement of the recommendations, the level of enforcement includes at least one of "No" enforcement, "Soft" enforcement or "Hard" enforcement.

12. The non-transitory machine-readable medium of claim 11, wherein the instructions to identify the plurality of connected devices includes instructions to perform an automatic discovery process by the risk manager system.

13. The non-transitory machine-readable medium of claim 11, wherein the system resource usage includes processor usage, memory usage, and disk space usage.

14. The non-transitory machine-readable medium of claim 11, wherein the non-transitory machine-readable medium is further encoded with instructions to selectively enforce the recommendations on each of the plurality of devices.

* * * * *